1,496,936

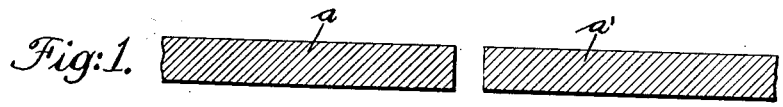
Fig:1.
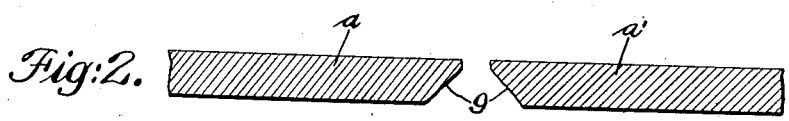
Fig:2.
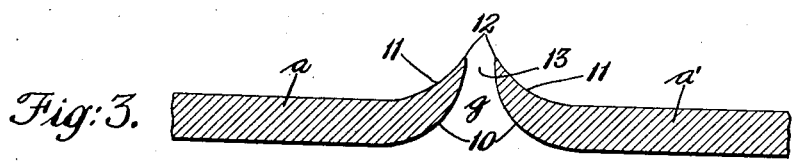
Fig:3.
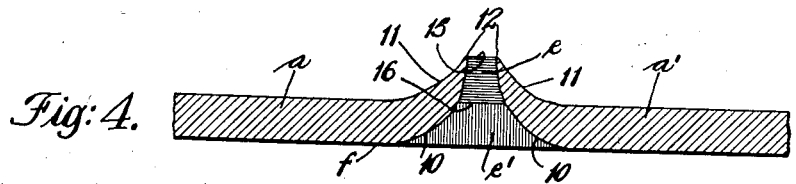
Fig:4.
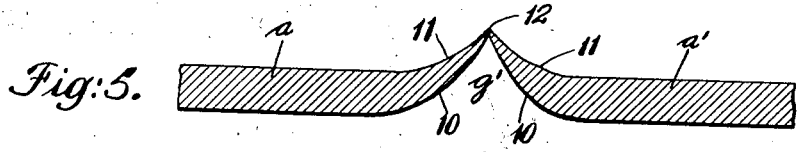
Fig:5.
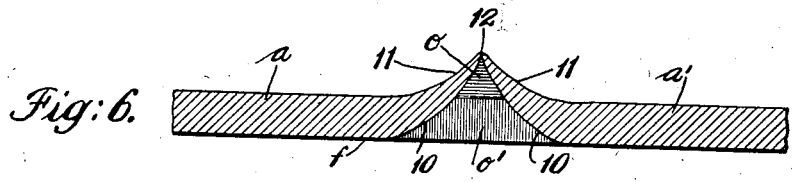
Fig:6.
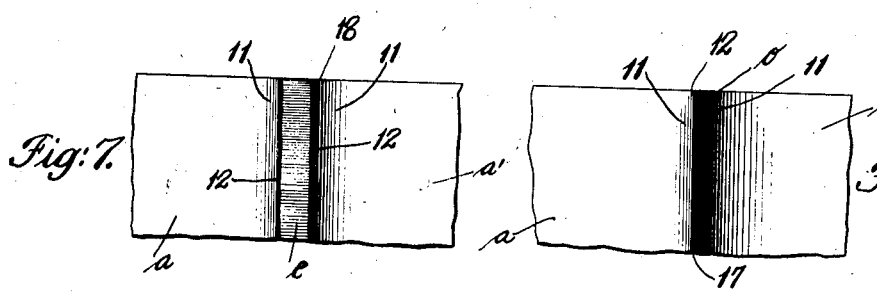
Fig:7.   Fig:8.
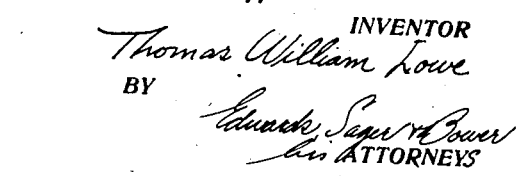
INVENTOR
Thomas William Lowe
BY
Edward Sayer & Bower
his ATTORNEYS Patented June 10, 1924.

UNITED STATES PATENT OFFICE.

THOMAS WILLIAM LOWE, OF WINNIPEG, MANITOBA, CANADA.

WELD AND PROCESS OF FORMING THE SAME.

Application filed December 8, 1921. Serial No. 520,834.

*To all whom it may concern:*

Be it known that I, THOMAS WILLIAM LOWE, a citizen of the Dominion of Canada, residing at Winnipeg, in the Province of Manitoba and Dominion of Canada, have invented certain new and useful Improvements in Welds and Processes of Forming the Same, of which the following is a specification.

My invention relates to welded joints and a process of forming the same and particularly to the welding of boiler plates. The chief object of the invention is to provide a weld which will be durable and as strong or stronger as the plates themselves.

Further objects of the invention particularly in providing for the formation of the weld from one side of the assembled plates will appear from the following description taken in connection with the accompanying drawings in which Fig. 1 is a sectional view showing the plate edge as received from the mill.

Figs. 2, 3 and 4 are similar views showing successive steps for the formation of an electric weld, Figs. 2, 5 and 6 are similar views showing the formation of the weld by the oxy-acetylene flame, and Figs. 7 and 8 are respectively plan views of the electric and oxy-acetylene welds.

Prior welding processes, such for instance as the single bevel or double bevel welds, have been lacking in strength and reliability and have been particularly difficult of formation particularly with boiler plates which are of relatively thick material and are usually accessible from only one side for welding. Another type of joint in which the plates are bent angularly has never been adopted for use in boilers or any articles for expansion and contraction because of the sharp limitations of the ledge so produced by bending and the necessity of welding from both sides of the joint and the rigidity of the joint which does not resist cracking.

According to my invention the joint and process overcome the objection of these prior welds in providing a strong durable weld which is smooth and even throughout its length and may be easily made from one side of the assembled sheets. The plates $a$, $a'$ as they come from the mill (Fig. 1) have their corners formed with beveled surfaces 9 (Fig. 2), this bevel being governed by the thickness of the plate to be welded and the subsequent curvature desired and the percentage of strength required in the joint as compared with the solid plate. The edges of the plates $a$, $a'$ are then bent (Fig. 3) so as to have an inner curvature 10 and an outer curvature 11 terminating in a tip 12. A groove $g$ is thus formed between the plates to be welded and this groove contracts inwardly to a narrowest portion 13 at the very bottom of the groove and presents extended fusing surface for the weld. The plates being curved in this manner also accommodate expansion and contraction stresses which are set up in the operation of welding.

For electric welding the plates $a$, $a'$ are spaced apart as indicated in Fig. 3 and an electric weld $e$ is run along the bottom of the groove forming an outer surface 15 flush with the tips 12 and an inner surface 16. The metal filler $e'$ is then deposited in the remainder of the groove to fill the same out flush with the surfaces of the plates $a$, $a'$ (Fig. 4) so that the completed joint comprises two separate deposits of fused metal and is of greater cross section and greater strength than the plates themselves. The depositing of the metal is accomplished by forming an arc by withdrawing the metal from the plate which is positive and the metal rod then becomes in a molten state and the adjacent face of the plates are likewise affected until the whole space is completely filled to the surface where it is kept flush. It is preferable to deposit the molten metal of the weld $e$ crossways for half the depth of the joint and the weld $e'$ longitudinally for the remaining half of the depth of the joint.

In forming the joint by oxy-acetylene welding it is preferable instead of spacing the plates apart as shown in Fig. 3 to bring the points of the curves together as shown in Fig. 5 and then to fill in the groove with two successive welds $o$ and $o'$ melted into the space between the plates with the use of the blow torch until the groove is filled flush with the plate surfaces (Fig. 6). In plan view therefore the oxy-acetylene weld will show a narrow line 17 (Fig. 8), whereas the electric weld will show a broad line 18 (Fig. 7).

The welded joint of this invention not only provides extended contact between the fused metal and the plate surfaces but also permits whatever thickness of metal is necessary for strength and forms the finished face *f* of the plates and joint flat without projecting edges or ridges. This flat surface may be arranged external or internal of the welded structure as desired. The tapering and curving of the plate edges economizes metal, provides increasing strength toward the base of each welded edge and gives a symmetrically curved finish to the parts. The shape of the groove to receive the fused metal permits the innermost portions to be readily reached and filled from one side. The curved tapering edges also provide the resiliency necessary to avoid the overstressing of the metal by the expansion and contraction stresses of welding and leave the metal of the plates unweakened. The fully strong plates are thus joined in simple manner by a weld having an excess of strength and an extended durable bond with the plate surfaces.

I claim:—

1. The combination with two plates each having their edges tapered and curved, of a weld composed of a filler material located between and uniting the inner surface of said edges.

2. The combination with two plates having opposing edges, each with inner and outer surfaces curved toward each other to closest proximity at their ends, and a weld composed of a filler material located between and uniting the inner surfaces of said opposing edges.

3. The combination with two plates of edges thereon forming with inner and outer surfaces curving toward each other to closer proximity at their ends, and a weld formed between said inner surfaces comprising a plurality of separate layers of filler material, the first layer extending in one direction and a successive layer extending in another direction.

4. The combination with two plates, of edges thereon formed with inner and outer surfaces curving toward each other to closest proximity at their ends and a weld formed between said inner surfaces comprising an inner portion and a separately formed outer portion.

5. The combination with two plates, of edges thereon formed with inner and outer surfaces curving toward each other to closest proximity at their ends and a weld formed between said inner surfaces comprising an inner portion extended transversely across the joint and an outer portion extended longitudinally across the joint substantially as described.

6. The process of forming a weld between two plates comprising tapering and curving the meeting plate edges and filling in the weld between the inner surfaces of said edges with a separate welding material.

7. The process of forming a welded joint between plates comprising beveling the adjacent edges, curving them, assembling the beveled curved edges in spaced relation and forming an electric weld between the inner surfaces of said edges by depositing a metal filler in layers between said edges.

8. The process of forming a welded joint between plates comprising beveling the adjacent edges, curving them, assembling the beveled curved edges in proximity to each other and depositing a filler material to form a weld between the inner surfaces of said edges.

9. The process of forming a welded joint between plates comprising beveling the adjacent edges of said plates, curving said edges to present a greater fusing area than the thickness of the plates and forming a weld between the inner surfaces of said edges by depositing a metal filler in layers between said edges.

10. The process of forming a welded joint between plates which comprises first beveling the corners of the edges of the adjacent plates, then bending the said edges outwardly so as to present an inner curvature and an outer curvature, then assembling the plates to bring the outwardly curved edges in juxtaposition, inserting a filler material between the inner surfaces of the opposing edges from one side of said plates and welding the same together.

THOMAS WILLIAM LOWE.